Aug. 12, 1947.  D. W. LIGHT  2,425,626
METHOD OF MAKING CLAY FILMS
Filed May 2, 1941
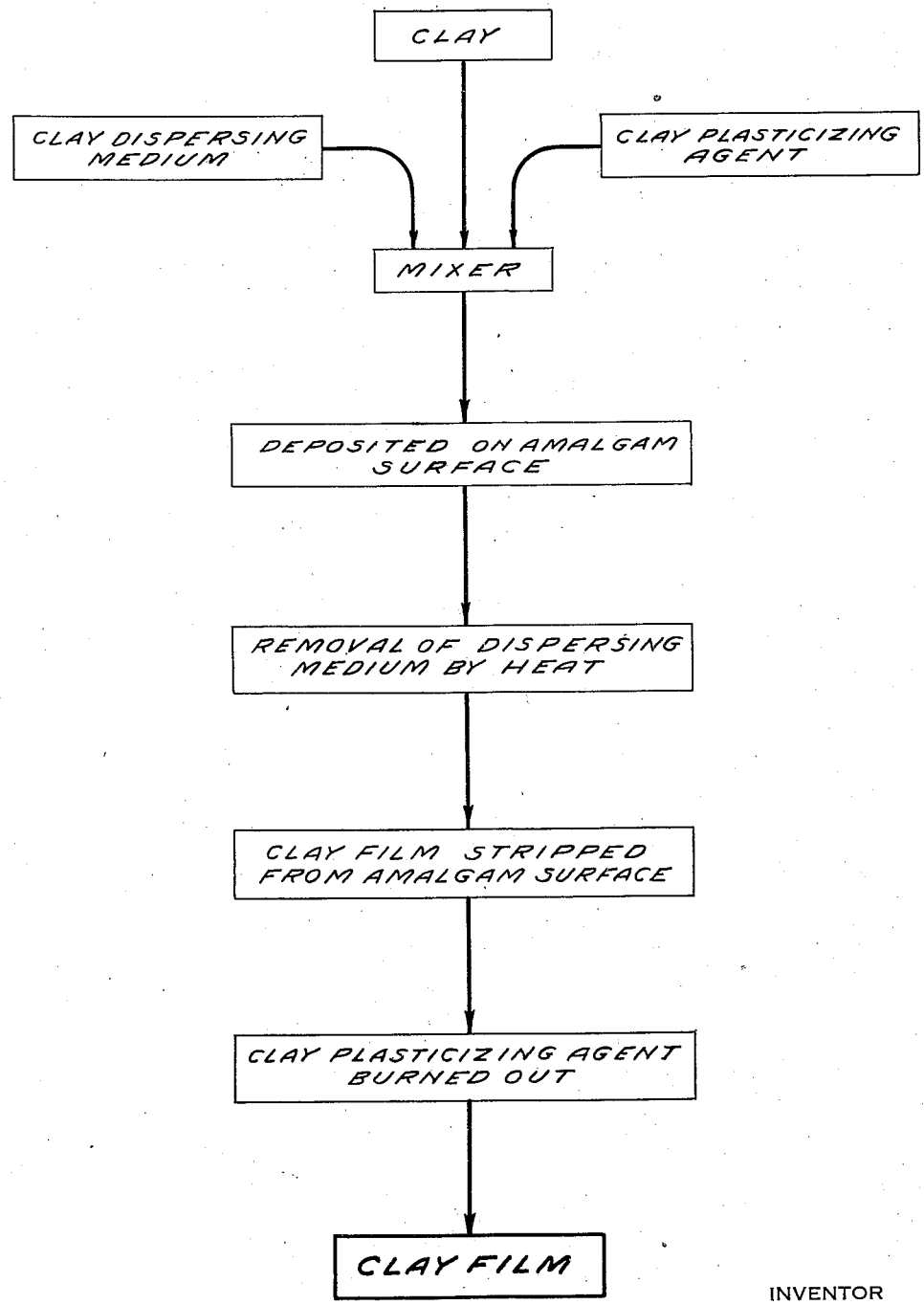
INVENTOR
DONALD W. LIGHT,
BY
ATTORNEY Patented Aug. 12, 1947

2,425,626

UNITED STATES PATENT OFFICE 2,425,626

METHOD OF MAKING CLAY FILMS

Donald W. Light, Old Greenwich, Conn., assignor to American Cyanamid Company, New York, N. Y., a corporation of Maine Application May 2, 1941, Serial No. 391,463

5 Claims. (Cl. 18—57)

1

The present invention relates to methods of producing thin flexible clay films.

Heretofore numerous binding media have been suggested for clay, such as colophony resins, natural gums, carbohydrates, pitches and tars. Films prepared from such mixtures have invariably necessitated a supporting surface such as paper, cloth, leather, and the like. Attempts have been made to prepare self-supporting clay films, but unfortunately such films also lack the strength and flexibility required for their general application.

It is an object of this invention to prepare a thin clay film which is capable of supporting itself without the necessity of a backing sheet and which is sufficiently flexible and strong to permit its fabrication and general use. A further object is to provide a clay sheet having highly desirable electrical insulation characteristics whereby the clay product may serve as a useful insulator for condensers, heating elements, motors, generators, etc.

To these ends, the invention contemplates the preparation of clay films on an amalgamated or equivalent surface by the evaporation of the dispersing medium from a colloidal clay dispersion modified by the inclusion of a suitable plasticizing agent. The film so formed is then stripped and may be used as such with or without sizing materials as a paper substitute. If useful electrical insulating properties are desired, the plasticizer is burned out, preferably in the presence of an excess of oxygen. When conditions permit, the clay film is fabricated and the plasticizer burned in situ.

The modified clay dispersions employed herein are readily prepared by making an aqueous slurry of the desired clay and subjecting the slurry in admixture with the plasticizing agent to homogenization or high speed agitation, as in a colloid mill. Also, if desired, the larger particles of clay may be separated from the slurry by centrifuging.

The clays utilized in accordance with this invention are the water-swellable type which, in general belong to the montmorillonite group of minerals. A colloidal clay, usually designated as bentonite, containing the water-swellable hydrous calcium-magnesium-aluminum silicates is particularly suitable for the production of the clay films.

As plasticizing agents incorporated in the clay dispersions, the water-soluble resins such as hexaethylene glycol maleate, sorbitol phthalate, and the like may be used. Also rubber latex, or aqueous dispersions of water-insoluble resins which have a plasticizing action, such as methyl methacrylate may be employed. The relative proportions of plasticizer and clay may be varied over a relatively wide range depending on the

2 characteristics desired of the finished film. In general, the clay dispersion should contain from 2 to 10% of clay, and equal or smaller amounts of the plasticizing agent.

Films of less than 10 microns in thickness are obtained. Thicker films may be obtained by applying several portions of the modified clay dispersion to the amalgamated surface and allowing each portion to partially dry before applying the succeeding one.

The drawing illustrates a preferred form of the invention.

The invention will be further illustrated by the following examples; parts indicated are by weight.

Example 1

A clay-resin dispersion was prepared by mixing together in a colloid mill 4 parts of bentonite, 2 parts of hexaethylene glycol maleate and 94 parts of water. This colloidal mixture was poured onto an amalgamated tin sheet and allowed to dry at a temperature not exceeding about 105° C. The thin film stripped readily from the amalgamated surface and showed exceptional strength and flexibility. It required no support or backing, and did not crack or craze readily on bending.

To show the modifying effect of the resin, a 4% aqueous suspension of bentonite was spread onto an amalgamated tin sheet. The water was evaporated at a temperature of from 100° to 105° C. The resulting deposit of clay could not be removed from the base material except with considerable difficulty, and such pieces of film as were removable lacked the desired characteristics of strength and flexibility necessary for fabrication.

Example 2

Equal parts of a 2.5% aqueous solution of hexaethylene glycol maleate and a 2.5% aqueous suspension of bentonite (freed from gritty materials by centrifugal treatment) were thoroughly mixed together. The resulting dispersion was spread on an amalgamated surface and dried for approximately 24 hours at 100°–105° C. A light brown flexible film, approximately 7 microns in thickness, was obtained.

Example 3

A colloidal dispersion was prepared in a high speed mixer using 3 parts of bentonite, 2 parts of hexaethylene glycol maleate and 95 parts of water. The dispersion was poured into a shallow metal tray having an amalgamated bottom surface. Moisture was removed by drying at approximately 105° C. for 24 hours. The resulting film was stripped from the amalgamated surface, baked for one hour at 300° C., followed by heating for one hour at 500° C. in order to burn out the resin. The clay film thus formed was somewhat flexible and possessed excellent electrical insulating properties.

Example 4

Equal parts of a 2.5% aqueous dispersion of a methyl methacrylate resin and a 2.5% aqueous suspension of bentonite were mixed together, spread on an amalgamated surface and dried for approximately 24 hours at 105° C. A dark gray, strong, flexible film was obtained.

Example 5

A dispersion prepared by mixing together equal parts of a 2.5% rubber latex emulsion and a 2.5% aqueous suspension of bentonite, was spread on an amalgamated tin sheet and allowed to dry at a temperature of from 100° to 105° C. The resulting film which stripped easily from the amalgamated sheet, was strong and very flexible.

Clay films produced in accordance with this invention find use as condenser dielectrics, mica substitutes, paper substitutes and the like.

While the invention has been described with particular reference to specific embodiments, it is to be understood that it is not to be limited thereto but is to be construed broadly and restricted solely by the scope of the appended claims.

I claim:

1. The method of preparing a clay film which includes the steps of depositing on an amalgamated surface a colloidal dispersion comprising a clay and a clay plasticizing agent where the quantity of clay present is at least equal to that of the plasticizer, removing the dispersing medium therefrom, and stripping the film from the surface.

2. A method of preparing a clay film less than 10 microns in thickness which includes the steps of depositing on an amalgamated surface a colloidal dispersion comprising a clay and a clay plasticizing agent, where the quantity of clay present is at least equal to that of the plasticizer, removing the dispersing medium therefrom, stripping the film from the surface, and burning the plasticizing agent out of the film.

3. The method of claim 1 in which the dispersing medium is removed by evaporation at a temperature not exceeding 105° C.

4. The method of claim 1 in which the colloidal dispersion is deposited on an amalgamated tin sheet.

5. The method of claim 1 in which the clay is bentonite.

DONALD W. LIGHT.

REFERENCES CITED

The following references are of record in the file of this patent:

UNITED STATES PATENTS

| Number | Name | Date |
| --- | --- | --- |
| 2,120,445 | Sutton | June 14, 1938 |
| 2,121,018 | Carter | June 21, 1938 |
| 2,266,637 | Hauser | Dec. 16, 1941 |
| 2,266,638 | Hauser | Dec. 16, 1941 |
| 2,266,636 | Hauser | Dec. 16, 1941 |
| 1,888,437 | Sherrick | Nov. 22, 1932 |

OTHER REFERENCES

Publication, Washington Star, description of "Alsifilm," section C, page 12, Oct. 16, 1938.